Sept. 7, 1965   J. F. MORSE   3,204,732
SINGLE LEVER CONTROL UNIT FOR CLUTCH AND THROTTLE HAVING
A THROTTLE DWELL AND AN AUXILIARY THROTTLE CONTROL
Filed Sept. 3, 1963   2 Sheets-Sheet 2
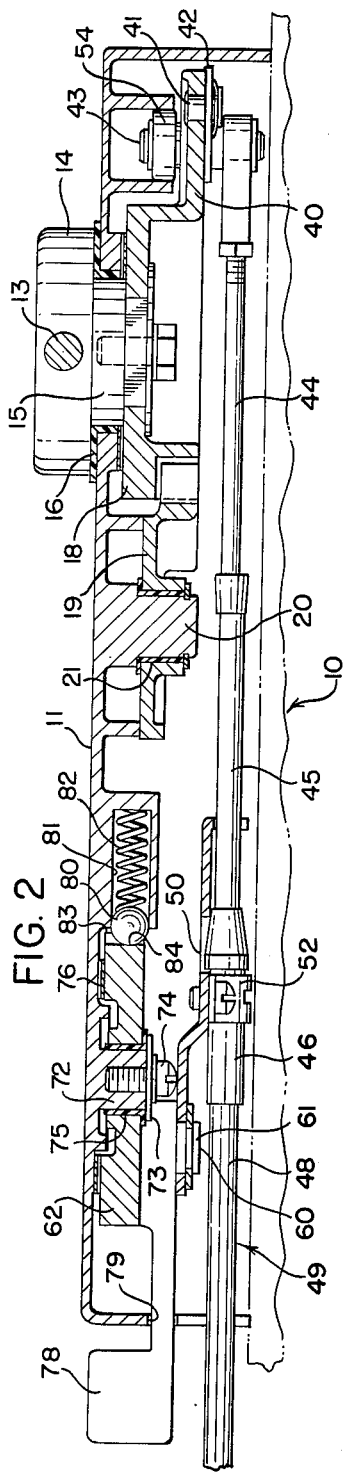
FIG. 2
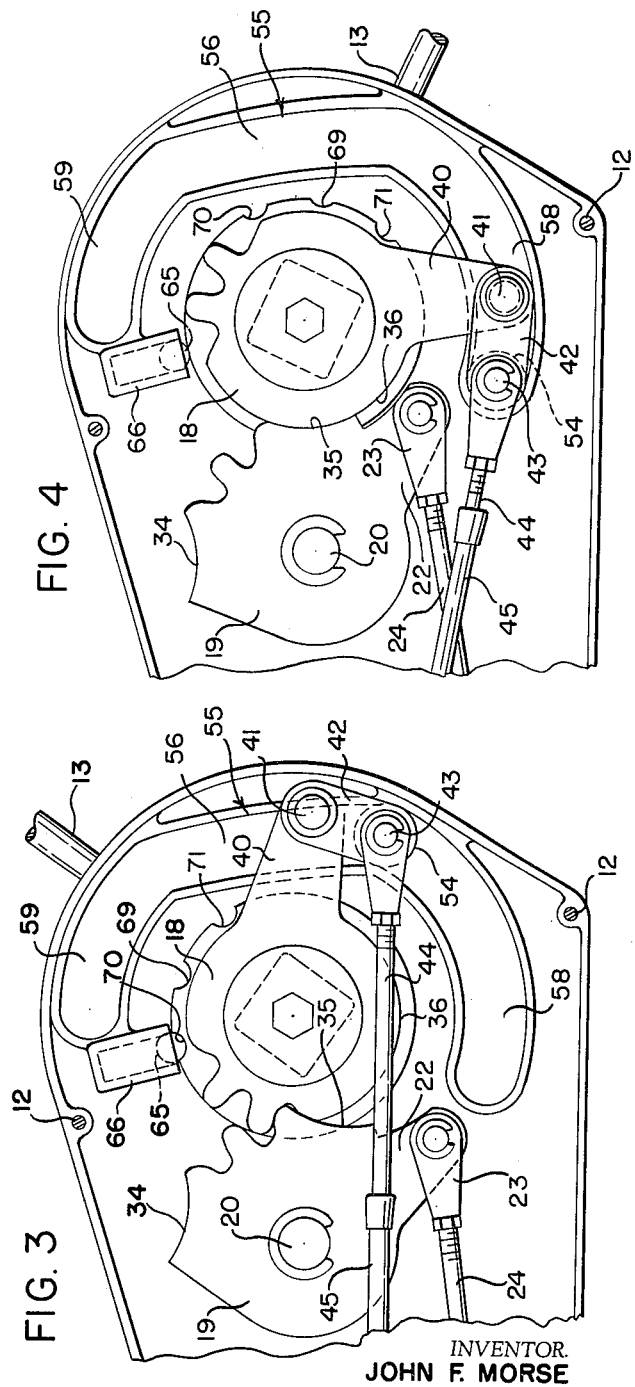
FIG. 4
FIG. 3
INVENTOR.
JOHN F. MORSE
BY Hamilton & Cook
ATTORNEYS United States Patent Office 3,204,732
Patented Sept. 7, 1965

3,204,732
SINGLE LEVER CONTROL UNIT FOR CLUTCH
AND THROTTLE HAVING A THROTTLE DWELL
AND AN AUXILIARY THROTTLE CONTROL
John F. Morse, 21 Clinton St., Hudson, Ohio
Filed Sept. 3, 1963, Ser. No. 306,208
9 Claims. (Cl. 192—.096)

The present invention relates generally to single lever control units adapted for operating both the clutch and throttle of an internal combustion engine. More particularly, the present invention relates to such a single lever control having an auxiliary throttle control for opening the throttle without operation of the clutch. Specifically, the present invention relates to a single lever control having an auxiliary throttle control and in which throttle movement is eliminated during operation of the clutch, irrespective of the setting of the auxiliary throttle control.

The advent of the single lever control as a replacement for the dual lever control was most propitious for the amateur power boating enthusiast and equally welcome to his professional counterpart.

In a dual lever control system one control lever is provided for operating the clutch, and a second control lever is provided for operating the throttle. This system works quite satisfactorily so long as the operator assiduously maintains the proper sequential operation between the clutch control lever and the throttle control lever.

For example, it is mandatory that the control levers be coordinated sequentially to control the speed of the engine during a shifting operation—whether going into or out of the forward or reverse shift positions. In going from neutral into forward or reverse shift position, the throttle must be in such a position as to prevent excessive wear on the clutch or other transmission mechanism and yet prevent stalling of the engine as the initial load is applied to the engine by the shift itself.

Similarly, prior shifting from "in gear" position to neutral, the engine must first be decelerated sufficiently to permit facile disengagement of the clutch or other transmission elements without the necessity of excessive pressure by the operator against the control lever and without racing the engine after disengagement. Overexertion of pressure on the control lever by the operator in shifting to neutral can often cause severe damage when the engine is operating at high speeds because of the likelihood of overtraveling the neutral position when the clutch or transmission is rotating at a speed above that at which the various moving parts can engage without damage.

One can especially appreciate the problems of sequentially controlling the dual controls in the proper manner when he imagines being faced with an emergency situation in which the motion of the boat must be immediately reversed—as, for example, an impending collision with either the dock or another boat. These difficulties attendant to the critical sequential operation of the clutch and throttle were obviated with the advent of the single lever control wherein mechanical means are employed to effect the requisite sequential control of throttle and clutch by actuation of a single control lever.

There are, however, two favorable aspects to the dual lever control system which have not heretofore simultaneously existed in any known single lever control. First, the clutch in a dual lever control, can be actuated without any advancement of the throttle; and, second, the throttle can be advanced completely independently of the clutch.

The first aspect is especially favorable because in some marine installations the reversing gear will be subject to severe damage if the throttle is not maintained at idle speeds. Moreover, even in those installations which permit some advance of the throttle during the shift without damage to the clutch or transmission, the mere fact of an increase in engine speed can itself be objectionable. In particular, boats used for pleasure often require a very low forward speed, sometimes indicated as idle forward. As an example, such a speed would be employed when trolling for fish.

The second aspect is particularly helpful when starting a cold motor. In such situations it is desirable to operate the engine at an increased speed during warm-up to prevent stalling. Moreover, it is often desirable to operate auxiliary power equipment such as generators, winches and the like while the boat is anchored or moored at the dock.

Heretofore, single lever controls have been devised in which, in addition to their sequential operation at the throttle and clutch, either the opening of the throttle during the shifting stage has been greatly reduced, or an auxiliary throttle control has been available for advancement of the throttle independently of the shift.

An example of a single lever control in which the throttle is not advanced during rotation of the control lever through the shifting range is shown in my U.S. Patent No. 2,919,772, and an auxiliary throttle control is shown in my U.S. Patent No. 2,884,109.

Each of the devices disclosed in my aforementioned patents is sufficient for its singular purpose. However, it has not been heretofore possible to combine the features of the two controls embodying the concepts of my aforementioned patents in one single lever control unit.

In order to provide the throttle dwell during actuation of the clutch, the control unit disclosed in Patent No. 2,919,772, must utilize a lost motion device. Such a device is not compatible with an auxiliary throttle control in which the throttle cable casing is moved in a direction opposite to the normal movement of the cable core since one would never be certain whether actuation of the auxiliary throttle control would advance the throttle or be absorbed in the lost motion device.

It is therefore an object of the present invention to provide a single lever control units for operating a marine engine in which throttle advance is eliminated through forward or reverse shift ranges.

It is another object of the present invention to provide a single lever control unit, as above, having an auxiliary throttle control for advancing the throttle a predetermined amount independently of the actuation of the shift mechanism.

It is a further object of the present invention to provide a single lever control unit, as above, in which the throttle setting at which the shift is accomplished may be preset.

It is a still further object of the present invention to provide a single lever control unit, as above, in which the throttle may be maintained at any predetermined setting at or above idle, throughout the shift range.

These and other objects which will become apparent from the following specification are accomplished by means hereinafter described and claimed.

One preferred embodiment is shown by way of example in the accompanying drawings and hereinafter described in detail without attempting to show all of the various forms and modifications in which the invention might be embodied; the invention being measured by the appended claims and not by the details of the specification.

In the drawings:

FIG. 2 is an enlarged cross section taken substantially on line 2—2 of FIG. 1;

FIG. 3 is a fragmentary area of FIG. 1 with the control lever in the forward shift position; and, FIG. 4 is a fragmentary area of FIG. 1 similar to FIG. 3 with the control lever in the full forward throttle position.

Figure 1:
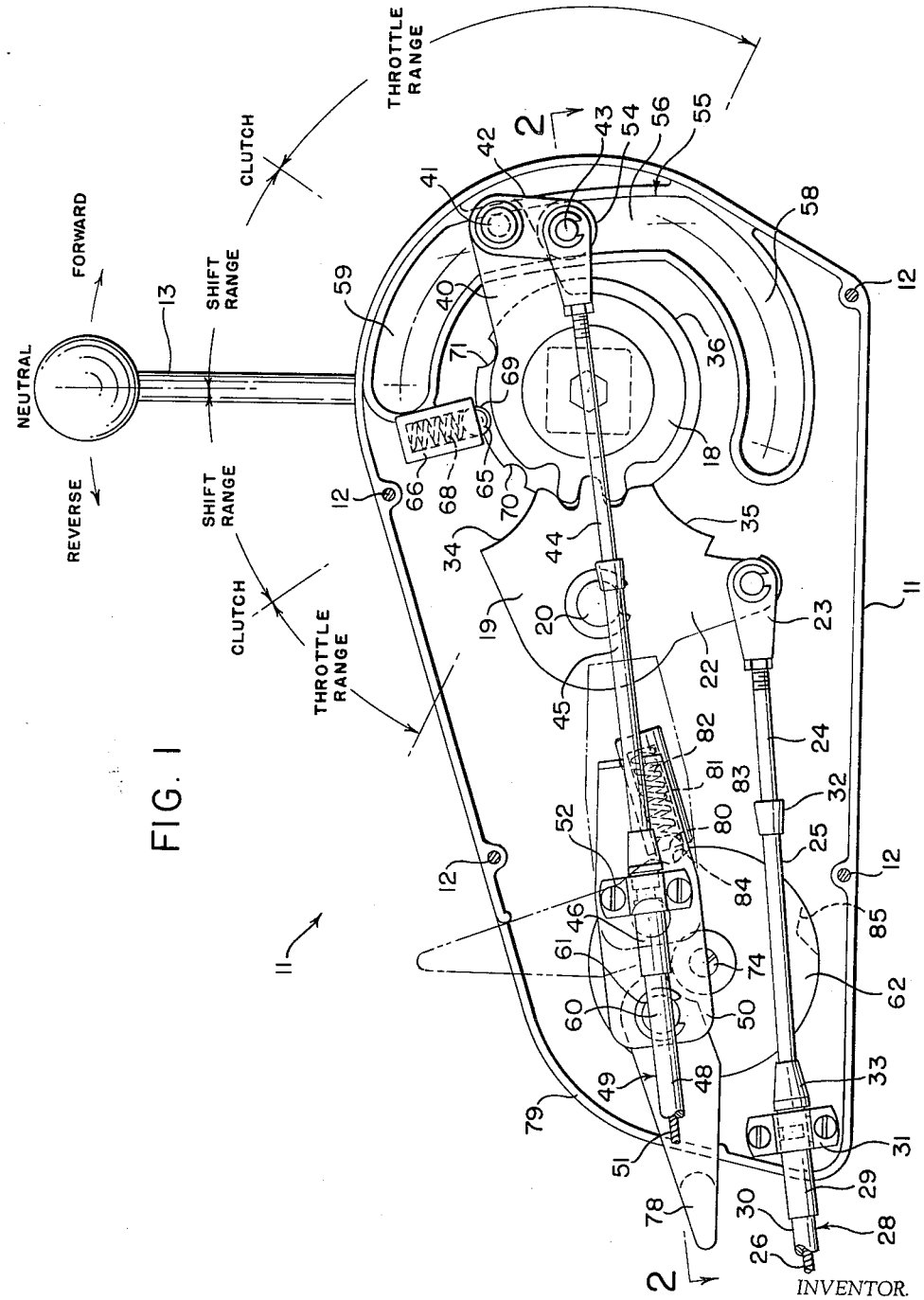
FIG. 1 is a rear side elevation of a single lever control unit embodying the invention, with the cover plate removed, showing the control lever and auxiliary control lever in neutral position and with the auxiliary throttle control lever, in phantom, in fully advanced position.

In general, a single lever control unit according to the concept of the present invention, provides a coordinated control of the throttle and clutch through the entire range of operation, the direction of rotation of the control lever from neutral selectively engaging forward or reverse gear. During that portion of rotation of the control lever to engage either forward or reverse gear, a throttle dwell is provided to maintain the throttle in the same position it was when the control lever was in a neutral position.

The control lever is operatively connected to rotate a drive gear which is meshed, through an interrupted gear means, to a secondary, or driven, clutch actuating gear. A throttle control arm extends radially outwardly of the drive gear and is attached, by link means, to the core of a push-pull cable which connects the control unit to the throttle of the engine. A cam follower mounted at the juncture of the link means and the throttle cable core is received in a channel cam, the shape of which prevents relative movement between the cable core and its casing during that portion of rotation of the control lever on either side of neutral during which the secondary gear is being rotated to engage or disengage the clutch or other transmission means.

An auxiliary throttle lever is also provided on the control unit. This auxiliary control lever is attached selectively to rotate an eccentric pivotally attached to the casing of the throttle control cable. Actuation of the auxiliary control lever moves the casing in a direction opposite to that in which the cable core is moved to open the throttle. This reverse movement of the casing varies the relative position of the core and casing so as to itself control the throttle through a limited range.

Referring more particularly to the drawings, the control unit, indicated generally by the numeral 10, embodying the concept of the present invention is incorporated in housing 11. A backplate, not shown, may be secured to the housing by a plurality of bolts 12, and is preferably provided with suitable means, not shown, for mounting the unit 10 to a control station or a mounting pad on the side of the boat.

A control lever 13 extends radially outwardly of hub 14 which is formed on the axially outer end of control shaft 15. Shaft 15 is journaled in housing 11, and a flanged, sleeve bushing 16 is preferably interposed between the shaft 15 and housing 11.

A primary drive gear 18 is nonrotatably secured to shaft 15 interiorly of housing 11. The primary drive gear 18, which is of the type known to the art as an "intermittent," or "interrupted," gear, meshes with the secondary, or driven, interrupted gear 19, when the control lever is in neutral position. The secondary interrupted gear 19 is journaled on a stub shaft 20 extending inwardly of housing 11. Similarly too, a flanged sleeve bushing 21 is interposed between the gear 19 and stub shaft 20.

A clutch control arm 22 which moves with the secondary gear 19 and which is shown to be integral therewith, has a swivel connector 23 attached to the outer end of a push rod 24 which telescopes within one end of a sleeve 25 and is attached to the core 26 of the clutch control push-pull cable 28. The other end of sleeve 25 is pivotally attached to a bushing 29. The bushing 29 is also secured to the casing 30 of the clutch control cable 28 and is mounted to the interior of the housing 11 by a clamp 31.

To maintain the interior of the cable 28 as dry as possible, resilient sealing sleeves 32 and 33 may be provided at the joint between the sleeve 25 and push rod 24 and at the joint between the sleeve 25 and bushing 29, respectively.

While the preferred embodiment is disclosed in conjunction with a cable control clutch, it will become apparent from the following description that the present concept is as readily suited for operation with electrically actuated clutches, reversing gears or the like, as with cable actuated clutches.

The gear members 18 and 19 may have teeth of the same pitch, as shown, which are meshed for approximately 35° rotation in either direction from the neutral position of FIG. 1 so that rotation of the drive gear 18 about 35° rotates the driven gear 19 in an opposite direction substantially the same amount. Beyond 35° the teeth become unmeshed and gear 18 can be rotated further to advance the throttle. After the driver gear 18 has been rotated sufficiently to unmesh the teeth, either arcuate face 34 or 35 on driven gear 19 engages the annular peripheral edge 36 of the drive gear so that the driven gear 19 remains stationary during advancement of the throttle, as shown in FIG. 4.

A throttle control arm 40 extends radially outwardly of drive gear 18. Pivotally connected, as by pin 41, to throttle control arm 40, is one end of a delay link 42. The other end of delay link 42 is pivotally attached, as by pin 43, to a push rod 44 which is telescopically received within one end of a sleeve 45. The other end of the sleeve 45 is pivotally attached to a bushing 46 which may be identical with the bushing 29. The rear end of the bushing 46 is secured to the casing 48 of throttle control cable 49 in the same manner as bushing 29 is secured to casing 30. Bushing 46 is secured to a swivel clip 50 by a clamp 52 to form an integral part of the hereinafter more fully described auxiliary throttle control.

The push rod 44 is also attached to the core 51 of throttle control push-pull cable 48.

Pin 43, which pivotally attaches delay link 42 to push rod 44 also rotatably mounts a roller 54 which extends into and acts as a cam follower in a channel cam, indicated generally by the numeral 55. The channel cam 55 is generally comprised of three distinct portions: a dwell portion 56 flanked by two throttle advance guide portions 58 and 59. Guide portion 58 is oriented to actuate throttle advancement after the forward shift range, and guide portion 59 is oriented to actuate throttle advancement after the reverse shift range.

The dwell portion 56 of the channel cam is arcuate about a center in the vicinity of point 60. It has been found that by placing point 60 in proximity to the eccentric pin 61 by which the swivel clip 50 is pivotally carried on the auxiliary throttle wheel drive member 62, as the cam follower 54 moves along the dwell portion 56 of channel cam 55, there will be no relative axial movement between the core 51 and casing 48 of throttle control cable 49, irrespective of whether the auxiliary throttle control is in idle or throttle advance position.

The location of the throttle control arm 40 and the length of the delay link 42 are preferably such that the cam follower 54 is located at the middle of the arcuate dwell portion 56 when the control lever 13 is in neutral position. In that way movement of the control lever 13 through either forward or reverse shift range effects no relative axial displacement between the core 51 and casing 48 of throttle control cable 49. However, when the cam following roller 54 enters the guide portions 58 or 59 continued rotation of the control lever 13 causes the push rod 44 to displace the core 51 and advance the throttle.

The juncture of guide portions 58 and 59 to the dwell portion 56 may be located so that the cam follower 54 enters the guide portions just prior to the completion of the shift rotation of driven gears 19, simultaneously with the completion or just after the completion. The dwell portion 56 shown in FIG. 3 is of such configuration that the cam roller 54 is about to enter the guide portion 58 just prior to the completion of rotation of the secondary gear 19. This arrangement will work with certain installations where a small throttle advancement applied near the end of the shift range is acceptable. However, it must be understood that a single lever control unit constructed in accordance with the concept of the present invention can provide a perfect dwell, or absolute maintenance of the throttle position, during the shift range by locating the juncture of the guide portions 58 and 59 to the dwell portions 56 such that the cam follower 54 remains within the dwell portion during the entire shift range.

The guide portions 58 and 59, while they must extend generally rearwardly of the dwell portion 56 need not be of any particular disposition. It has been found that highly satisfactory results may be obtained if the guide portions 58 and 59 are straight or arcuate as shown. It must be remembered, however, that the disposition of the guide portions 58 and 59 must remain within the length of the delay links 42 from its pivotal connection to the throttle control arm 40 to prevent the unit from binding. As shown specifically in FIG. 4, the guide portions 58 and 59 have been made arcuate about the center of gear 18 and no binding can occur as the throttle is moved to full open position. Further, it should be understood that uniformity in configuration of the guide portion is desirable to assure a throttle advance rate in conformity with the rate at which the control lever 13 is actuated.

A detent means comprising a ball 65 slidable in a housing 66 and biased outwardly by a spring 68 may be provided to engage the peripheral edge 36 of drive gear 18. A notch 69 in the edge of gear 18 can be provided to indicate neutral position and similar notches 70 and 71 may be provided to indicate the end of the forward and reverse shift ranges, respectively.

The auxiliary throttle control comprises a wheel drive member 62 journaled for rotation about a stub shaft 72 in housing 11. As best seen in FIG. 2, the wheel drive member 62 is secured to the stub shaft 72 by a retaining washer 73 mounted on the end of stub shaft 72 by a cap screw 74 and which engages the flange of a flanged sleeve bushing 75 upon which the wheel drive member rotates.

A flat ring bushing 76 is positioned between the track of the wheel drive member 62 and the housing 11 to further facilitate rotation of the member 62. A thumb lever 78 is attached to, or, as shown, is formed integrally with wheel drive member 62. Lever 78 extends rearwardly and outwardly through a slot 79 in housing 11 where it can be manually rotated.

The eccentric pin 61 extends outwardly from the face of the wheel drive member 62 and pivotally carries the mounting bushing 50, as hereinbefore described.

Some slack is required in the throttle control push-pull cable 49 outwardly of the control unit for this auxiliary throttle control to operate. This slack is preferably located between the unit 11 and the first place to which the cable is secured to the boat, preferably some four or five feet away. Accordingly, when the thumb lever is rotated, as from the solid to the phantom position shown in FIG. 1, the mounting bushing 50 is translated forwardly in an arcuate path on its eccentric pin 61. This pulls the casing 48 forwardly, taking up part of the slack in the cable 49. Since the core 51 is held rigid by the positioning of the cam follower 54 in the dwell portion 56 of channel cam 55, a differential rearward movement of the core 51 is exerted which advances the throttle.

A detent means may also be provided to operate in conjunction with the auxiliary throttle control. This detent means comprises a ball 80 slidable in a core 81 and biased forwardly by the action of the compression spring 82 to engage the periphery 83 of the wheel drive member 62. It is desirable to provide a notch 84 in the periphery 83 to indicate when the auxiliary throttle control is positioned at full idle. Other notches may be provided to indicate various incremental advances of the throttle, as may be desirable for the particular installation. For example, a notch 85 may be provided to indicate an advancement of the throttle suitable for operating auxiliary equipment or the like.

The present control does not provide interlocks between the auxiliary throttle control and the main control lever. Some of the latest model marine engines are being provided with hydraulic and electric clutches, certain types of which are quite capable of satisfactory engagement and disengagement at speeds above idle. When using said engines it is often particularly desirable to allow the throttle to be advanced slightly prior to actuation of the clutch to avoid the possibility of having a cold engine stall during an attempted shift.

With a satisfactory accommodation of a control of the type which permits the clutch to be engaged after the auxiliary throttle control has actuated partially to open the throttle to any engine, the available throttle dwell is critical.

For example, when an auxiliary throttle mechanism is employed with a clutch actuating mechanism of the type disclosed in my prior U.S. Patent No. 2,987,152, a limited advancement of the auxiliary throttle may or may not be permissible during actuation of the clutch.

The clutch actuating mechanism disclosed in U.S. Patent No. 2,987,152 can not maintain a complete dwell in the movement of the cable core with respect to the casing. The throttle dwell available with such a control must depend to some degree upon the backlash in the mechanical elements of the throttle system, and it has been found unsatisfactory to rely on such a dwell for clutches or other transmissions having critical engaging speeds. Irrespective of whether there is a small or large amount of backlash in a given system, for the auxiliary throttle control to advance the throttle, it must first absorb all the backlash available and then advance the throttle the desired amount. If the main control lever is then moved to accomplish the shift and there is no backlash available, an immediate increase in engine speed results. This has proved to be a deleterious aspect to cluches or other transmission means having critical, particularly low, engagement speeds.

A control embodying the concept of the present invention fully obviates the difficulties inherent to the prior art control by employing a concept utilizing an absolute throttle dwell during the shift range irrespective of the degree of actuation of the auxiliary throttle control.

Moreover, it should be apparent that the present concept can be as readily adapted to pull-to-open throttles as to the push-to-open type shown in the present disclosure. This would be accomplished by reversing the direction of the throttle control arm 40 and the channel cam. In such a construction the channel cam, however, would probably be located in the cover plate rather than in the housing in order to prevent interference with the secondary, or clutch control, gear.

What is claimed is:

1. A single lever control unit for the throttle and clutch of an engine, said control unit being connected to the throttle by a push-pull cable having a core and casing and comprising, a control lever having a neutral position, a throttle control member rotatable by said control lever, a link means pivotally attached to said throttle control member, a cam follower attached to said link means, said cam follower connected to the core of said push-pull cable, a channel cam fixedly positioned in said unit, said cam follower received in said channel cam to provide a throttle dwell during substantially complete actuation of said clutch, a mounting bushing connected to said push-pull cable casing, auxiliary throttle control means to move said mounting bushing so as to move the cable casing in a direction substantially opposite the direction of movement of said cable core when advancing the throttle by actuation of said control lever, and means for actuating the clutch during the first portion of rotation of said control lever in either direction from neutral position.

2. In a single lever control unit for the throttle and clutch of an engine, said unit being connected to the engine throttle by a push-pull cable having a core and a casing, said unit having a housing, a control lever having a neutral position and rotatable in either direction therefrom, a primary member rotatable by said control lever for throttle control, a secondary member for clutch control connected to said primary member for cooperative movement only during the first portion of movement of said primary member in either direction from neutral position, link means pivotally connected to said primary member, said link means also pivotally connected to the core of said throttle control cable, said cable casing mounted on said housing, means selectively to move said casing with respect to said core, a cam follower mounted on said link means outwardly of the connection of said link means to said primary member, a channel cam fixedly positioned in said unit, said channel cam having a dwell portion and a guide portion at each end of said dwell portion, said cam follower received in said channel cam and movable through said dwell and wing portions, said cam follower remaining in said dwell portion during substantially the entire first portion of movement of said primary member in either direction from neutral position to prevent relative movement between the core and casing of said throttle control cable, thereafter, during continued movement of said primary member, said cam follower entering a guide portion to assure relative movement between said core and casing for advancement of said throttle.

3. In a single lever control unit for the throttle and clutch of an engine, said unit being connected to the engine throttle by a push-pull cable having a core and a casing, said unit having a housing, a control lever, a primary member rotatable by said control lever for throttle control having a neutral position and rotatable in either direction therefrom, a secondary member for clutch control connected to said primary member for cooperative movement only during the first portion of movement of said primary member in either direction from neutral position, link means pivotally connected to said primary member, said link means also pivotally connected to the core of said throttle control cable, said cable casing mounted on said housing, means for independently moving said casing in a direction substantially opposite the direction of movement of said core when advancing the throttle by actuation of said control lever, a cam follower mounted on said link means outwardly of the connection of said link means to said primary member, a channel cam fixedly positioned in said unit, said cam follower received in said channel cam, said channel cam having a dwell portion and a guide portion at each end of said dwell portion, said cam follower remaining in said dwell portion during substantially the entire first portion of movement of said primary member in either direction from neutral position to prevent relative movement between the core and casing of said throttle control cable, thereafter, during continued movement of said primary member, said cam follower entering a guide portion to assure relative movement between said core and casing for advancement of said throttle.

4. In a single lever control unit for the throttle and clutch of an engine, said unit being connected to the engine throttle by a push-pull cable having a core and a casing, said unit having a housing, a control lever, a primary member rotatable by said control lever for throttle control and having a neutral position and rotatable in either direction therefrom, a secondary member for clutch control connected to said primary member for cooperative movement only during the first portion of movement of said primary member in either direction from neutral position, link means pivotally connected to said primary member, said link means also pivotally connected to said push-pull cable core, a mounting bushing connected to said casing, an auxiliary control means, means for attaching said bushing to said auxiliary control means, said auxiliary control means mounted in said housing for independently moving said casing with respect to said core, a cam follower mounted on said link means outwardly of the connection of said link means to said primary member, a channel cam fixedly positioned in said unit, said cam follower received in said channel cam, said channel cam having a dwell portion and a guide portion at each end of said dwell portion, said dwell portion being arcuate about a center located in proximity to the mounting means by which said bushing is connected to said auxiliary control means, said cam follower remaining in said dwell portion during substantially the entire first portion of movement of said primary member in either direction from neutral position to prevent relative movement between the core and casing of said throttle control cable, thereafter, during continued movement of said primary member, said cam follower entering a guide portion to assure relative movement between said core and casing for advancement of said throttle.

5. In a single lever control unit for the throttle and clutch of an engine, said unit being connected to the engine throttle by a push-pull cable having a core and a casing, said unit having a housing, a control lever rotatably mounted in said housing, a primary member rotatable by the control lever for throttle control and having a neutral position and rotatable in either direction therefrom, a secondary member for clutch control operatively connected to said primary member for cooperative movement only during the first portion of movement of said primary member in either direction from neutral position, link means pivotally connected to said primary member, said link means also pivotally connected to the core of said throttle control cable, a mounting bushing connected to said push-pull cable casing, an eccentric journaled in said housing, said mounting bushing mounted on said eccentric, control means for selectively actuating said eccentric so as to move the casing in a direction substantially opposite the direction of movement of said cable core when advancing the throttle by actuation of said control lever, a cam follower mounted on said link means outwardly of the connection of said link means to said primary member, a channel cam fixedly positioned in said housing, said cam follower received in said channel cam, said channel cam having a dwell portion and a guide portion at each end of said dwell portion, said dwell portion being arcuate about a center located in proximity to the mounting of said eccentric to said bushing, said cam follower remaining in said dwell portion during substantially the entire first portion of movement of said primary member in either direction from neutral position to prevent relative movement between the core and casing of said throttle control cable, thereafter, during continued movement of said primary member, said cam follower entering a guide portion to assure relative movement between said core and casing for advancement of said throttle.

6. In a single lever control unit for the throttle and clutch of an engine, said unit being connected to the engine throttle by a push-pull cable having a core and a casing, said unit having a housing, a control lever rotatably mounted in said housing, a primary drive gear journaled in said housing and selectively rotatable in either direction from a neutral position by said control lever, a secondary driven means for clutch control in said housing, tooth means operatively connecting said driven means to said drive gear for movement only during the first portion of movement of said drive gear in either direction from neutral position, a delay link, one end of said delay link pivotally secured to said drive gear, a connector means operatively attached to the core of said push-pull cable for actuation of the throttle, the other end of said delay link pivotally secured to a connector means, auxiliary control means, said control means connected to said push-pull cable casing, actuation of said auxiliary control means adapted to move said casing with respect to said core, a cam follower mounted at the pivotal connection of said delay link and said connector means, a channel cam fixedly positioned in said housing, said cam having a dwell portion and two guide portions, said cam follower movably received within said cam, said dwell portion being arcuate about a center located in the vicinity of the connection of said auxiliary control means to said casing, movement of said cam follower restricted to movement along the arc thereof to prevent relative axial movement of said core with respect to said casing while said cam follower is moving within said dwell portion, said guide portions oriented angularly with respect to said dwell portion to cause said core to move axially with respect to said casing when said cam follower is moving along either of said guide portions.

7. In a single lever control unit for the throttle and clutch of an engine, said unit being connected to the engine throttle by a push-pull cable having a core and a casing, said unit having a housing, a control lever rotatably mounted in said housing, a primary drive gear journaled in said housing and selectively rotatable in either direction from a neutral position by said control lever, a secondary driven gear for clutch control journaled in said housing, tooth means operatively connecting said driven gear to said drive gear for rotation only during the first portion of movement of said drive gear in either direction from neutral position, a delay link, one end of said delay link pivotally secured to said drive gear, a connector means, the other end of said delay link pivotally secured to said connector means, said connector means operatively attached to the core of said push-pull cable for actuation of the throttle, auxiliary control means mounted in said housing, said control means connected to said push-pull control cable casing, actuation of said control means adapted to move said casing with respect to said core, a cam follower mounted at the pivotal connection of said delay link and said connector means, a channel cam fixedly positioned in said housing, said cam having a dwell portion and two guide portions, said dwell portion being arcuate about a center located in the vicinity of the connection of said auxiliary control means to said casing, said dwell portion having side walls, said cam follower movably received within said cam, said side walls limiting movement of said cam follower within said dwell portion along the arcuate path thereof, movement of said cam follower within said dwell portion preventing relative axial movement of said core with respect to said casing while said cam follower is moving within said dwell portion, said guide portions oriented angularly with respect to said dwell portion to cause said core to move axially with respect to said casing when said cam follower is moving along either of said guide portions, guide portions oriented angularly with respect to said dwell portion to cause said core to move axially with respect to said casing when said cam follower is moving along either of said guide portions.

8. In a single lever control unit for the throttle and clutch of an engine, said unit being connected to the engine throttle by a push-pull cable having a core and a casing, said unit having a housing, a control lever rotatably mounted in said housing, a primary drive gear journaled in said housing and selectively rotatable in either direction from a neutral position by said control lever, a secondary driven gear for clutch control journaled in said housing, tooth means operatively connecting said driven gear to said drive gear for rotation only during the first portion of movement of said drive gear in either direction from neutral position, a delay link, one end of said delay link pivotally secured to said drive gear, a connector means, the other end of said delay link pivotally secured to a connector means, said connector means operatively attached to the core of said push-pull cable for actuation of the throttle, a mounting bushing connected to said push-pull cable casing, an eccentric journaled in said housing, said mounting bushing mounted on said eccentric, auxiliary control means for selectively actuating said eccentric so as to move the casing in a direction substantially opposite the direction of movement of said cable core when advancing the throttle by actuation of said control lever, a cam follower mounted at the pivotal connection of said delay link and said connector means, a channel cam fixedly positioned in said housing, said cam having a dwell portion and two guide portions, said cam follower movably received within said cam, said dwell portion being arcuate about a center located in proximity to the mounting of said eccentric to said bushing, movement of said cam follower restricted to movement along the arc thereof to prevent relative axial movement of said core with respect to said casing while said cam follower is moving within said dwell portion, said guide portions oriented angularly with respect to said dwell portion to cause said core to move axially with respect to said casing when said cam follower is moving along either of said guide portions.

9. In a single lever control unit for the throttle and clutch of an engine, said unit being connected to the engine throttle by a push-pull cable having a core and a casing, said unit, having a housing, a control lever rotatably mounted in said housing, a primary drive gear journaled in said housing and selectively rotatable in either direction from a neutral position by said control lever, a secondary driven gear for clutch control journaled in said housing, tooth means operatively connecting said driven gear to said drive gear for rotation only during the first portion of movement of said drive gear in either direction from neutral position, a delay link, one end of said delay link pivotally secured to said drive gear, a connector means, the other end of said delay link pivotally secured to said connector means, said connector means operatively attached to the core of said push-pull cable for actuating of the throttle, a mounting bushing connected to said push-pull cable casing, an eccentric journaled in said housing, said mounting bushing mounted on said eccentric, control means for selectively actuating said eccentric so as to move the casing in a direction substantially opposite the direction of movement of said cable core when advancing the throttle by actuation of said control lever, a cam follower mounted at the pivotal connection of said delay link and said connector means, a channel cam fixedly positioned in said housing, said cam having a dwell portion and two guide portions, said dwell portion being arcuate about a center located in proximity to the mounting of said eccentric to said bushing, said dwell portion having side walls, said cam follower removably received within said cam, said side walls limiting movement of said cam follower within said dwell portion along the arcuate path thereof, movement of said cam follower within said dwell portion preventing relative axial movement of said core with respect to said casing while said cam follower is moving within said dwell portion, said guide portion oriented angularly with respect to said dwell portion to assure that said core moves axially with respect to said casing when said cam follower is moving along either of said guide portions.

References Cited by the Examiner
UNITED STATES PATENTS

| | | | |
|---|---|---|---|
| 2,919,772 | 1/60 | Morse | 192—.096 |
| 2,971,618 | 2/61 | Morse. | |
| 2,987,152 | 6/61 | Morse | 192—.096 |
| 3,057,221 | 10/62 | Smith | 192—.096 |

DAVID J. WILLIAMOWSKY, *Primary Examiner.*